United States Patent
Harada

(10) Patent No.: US 9,541,700 B2
(45) Date of Patent: Jan. 10, 2017

(54) OPTICAL SHEET FOR USE IN AN EDGE LIGHT TYPE BACKLIGHT UNIT

(75) Inventor: Kenichi Harada, Gobo (JP)

(73) Assignee: KEIWA INC., Osaka (JP)

( * ) Notice: Subject to any disclaimer, the term of this patent is extended or adjusted under 35 U.S.C. 154(b) by 1231 days.

(21) Appl. No.: 11/511,771

(22) Filed: Aug. 29, 2006

(65) Prior Publication Data

US 2007/0053080 A1    Mar. 8, 2007

(30) Foreign Application Priority Data

Aug. 30, 2005    (JP) .................................. 2005-249359

(51) Int. Cl.
*G02B 6/00* (2006.01)
*G02F 1/13357* (2006.01)
*F21V 8/00* (2006.01)
*G02F 1/1335* (2006.01)
*G02F 1/13363* (2006.01)

(52) U.S. Cl.
CPC ......... *G02B 6/0056* (2013.01); *G02F 1/13362* (2013.01); *G02F 1/133536* (2013.01); *G02B 6/0051* (2013.01); *G02B 6/0053* (2013.01); *G02F 1/13363* (2013.01); *G02F 2001/133607* (2013.01); *G02F 2202/40* (2013.01)

(58) Field of Classification Search
USPC ..................................... 349/62, 63; 362/558
See application file for complete search history.

(56) References Cited

U.S. PATENT DOCUMENTS

| | | | | |
|---|---|---|---|---|
| 5,587,816 A * | 12/1996 | Gunjima et al. | ................. | 349/62 |
| 5,712,694 A * | 1/1998 | Taira et al. | ....................... | 349/9 |
| 6,669,865 B1 * | 12/2003 | Coates et al. | ............ | 252/299.01 |
| 6,852,396 B1 * | 2/2005 | Mineo | .................. | G02B 5/0226 349/112 |
| 7,095,464 B2 * | 8/2006 | Ito | ........................ | G02B 5/0226 349/112 |
| 7,324,177 B2 * | 1/2008 | Kawanishi | ........... | G02B 5/0226 349/112 |
| 7,755,727 B2 * | 7/2010 | Harada | ............. | G02F 1/133528 349/117 |
| 7,986,388 B2 * | 7/2011 | Harada | .................... | G02B 1/10 349/122 |
| 8,928,843 B2 * | 1/2015 | Harada | ................ | G02B 6/0056 349/115 |
| 2003/0049456 A1 * | 3/2003 | Kawasato et al. | ............ | 428/421 |
| 2003/0063236 A1 | 4/2003 | Watson et al. | | |
| 2003/0128313 A1 * | 7/2003 | Kaminsky et al. | ........... | 349/112 |
| 2004/0047163 A1 * | 3/2004 | Harada et al. | ................ | 362/558 |

(Continued)

FOREIGN PATENT DOCUMENTS

EP    0 597 261    5/1994
JP    7-5305    1/1995

(Continued)

*Primary Examiner* — Michelle R Connelly
(74) *Attorney, Agent, or Firm* — Norris McLaughlin & Marcus, P.A.

(57) ABSTRACT

A substrate film for an optical sheet is made of a transparent resin and is formed into a rectangular shape. The substrate film for the optical sheet has an optical anisotropy and has an absolute value of the angle of the crystal orientation with respect to the short side orientation which is $\pi/16$ or greater and $3\pi/16$ or less.

9 Claims, 7 Drawing Sheets

(56) References Cited

U.S. PATENT DOCUMENTS

| | | | |
|---|---|---|---|
| 2004/0052079 A1* | 3/2004 | Nakano | F21V 7/22 362/343 |
| 2004/0201794 A1 | 10/2004 | Chen et al. | |
| 2004/0233350 A1* | 11/2004 | Kawanishi | G02B 5/0226 349/96 |
| 2005/0030444 A1* | 2/2005 | Fujiwara | G02F 1/133615 349/64 |
| 2005/0063062 A1* | 3/2005 | Ito | G02B 5/0226 359/599 |
| 2006/0268199 A1* | 11/2006 | Kawanishi | G02B 5/0226 349/96 |
| 2007/0139782 A1* | 6/2007 | Ito | G02B 5/0226 359/599 |
| 2008/0123028 A1* | 5/2008 | Harada | G02B 6/0056 349/96 |

FOREIGN PATENT DOCUMENTS

| | | |
|---|---|---|
| JP | 9-073083 | 3/1997 |
| JP | 11-003608 | 1/1999 |
| JP | 2000-89007 | 3/2000 |
| JP | 2000-162549 | 6/2000 |
| JP | 2004-319171 | 11/2004 |
| JP | 2006-039056 | 2/2006 |
| TW | 594115 | 10/1982 |
| TW | I235253 | 10/1991 |

\* cited by examiner (a)

(b)

OPTICAL SHEET FOR USE IN AN EDGE LIGHT TYPE BACKLIGHT UNIT

BACKGROUND OF THE INVENTION

Field of Invention

The present invention relates to substrate films for an optical sheet, optical sheets, and backlight units capable of markedly enhancing utilization efficiency of rays of light and improving luminance.

Description of the Related Art

Liquid crystal display (LCD) devices have been frequently used as a flat panel display through utilizing features of thinness, lightness in weight and low level of electric power consumption, and applications thereof have been increasing year by year. The liquid crystal display devices in widespread use have involved a backlight system where light emission is executed by irradiating onto a liquid crystal layer from the back face. In such a type of display devices, a backlight unit which is an edge light type, an immediate beneath type or the like is provided to an under face side of the liquid crystal layer. Such a backlight unit 50 of an edge light type is equipped with a rod-shaped lamp 51 for use as a light source, an optical waveguide plate 52 having a square plate shape disposed so that the edge thereof abuts along the lamp 51, a light diffusion sheet 53 disposed to the front face side of the optical waveguide plate 52, and a prism sheet 54 disposed to the front face side of the light diffusion sheet 53, as fundamentally shown in FIG. 9A.

Referring to functions of this backlight unit 50, rays of incident light from the lamp 51 to the optical waveguide plate 52 are first reflected on reflection dots or a reflection sheet (not shown in the Figure) of the back face of the waveguide plate 52, and exit from the front face of the waveguide plate 52. The rays of light exited from the waveguide plate 52 enter into the light diffusion sheet 53, then are diffused by the light diffusion sheet 53 and exit from the front face of the light diffusion sheet 53. Thereafter, the rays of light exited from the light diffusion sheet 53 enter into the prism sheet 54, and exit as rays of light having a distribution representing a peak in an orientation along a substantially normal line via a prism part 54a formed on the front face of the prism sheet 54.

Accordingly, the rays of light exited from the lamp 51 are diffused by the light diffusion sheet 53, and refracted by the prism sheet 54 so that they represent a peak in a direction along the substantially normal line, and illuminate the entire face of the liquid crystal layer on the front face side (not shown in the Figure). Meanwhile, although not shown in the Figure, a light diffusion sheet may be further disposed to the front face side of the prism sheet 54 for the purpose of: relaxation of light condensing properties of the prism sheet 54 as described above; protection of the prism part 54a; or prevention of the sticking between the prism sheet 54 and the liquid crystal panel such as a polarizing plate.

The light diffusion sheet 53 to be disposed in the backlight unit 50 generally has a transparent substrate layer 56 made of a synthetic resin, and a light diffusion layer 57 overlaid on the front face of the substrate layer 56 as shown in FIG. 9B (for example, see, JP-A Nos. H07-5305 and 2000-89007). In general, this light diffusion layer 57 includes resin beads 59 in a transparent resin binder 58, and the beads 59 exert the light diffusion function.

In recent years, characteristics required for LCD vary depending on their application, but may include brightness (high luminance), visibility (widening of viewing angle), energy saving, thin and light modeling capability and the like. Particularly, high luminance has been inevitably desired. However, in order to secure the luminance while keeping the concept of LCD, i.e., thin and light modeling, merely improving the optical waveguide plate 52 and the lamp 51 in the backlight unit 50 such as a cold-cathode tube is not satisfactory under current circumstances.

In LCD, a polarizing plate serves as a requisite essential member. Generally used polarizing plates are those which exhibit absorption dichroism, i.e., absorption of one directional component of a light accompanied by transmission of remaining polarization components. This type of the polarizing plate absorbs 50% of the light, in principle, for achieving polarization, therefore, it falls under one great reason for deterioration of the utilization efficiency of the light in LCD.

Recently, in order to enhance the utilization efficiency of the light, a reflection polarizing plate is disposed at an upper position in the backlight unit 50. This reflection polarizing plate allows a transmission axis component of the polarizing plate to transmit directly, while other polarization components are allowed to return to the lower side, whereby recycling the rays of light. However, also according to the backlight unit 50 in which such a reflection polarizing plate is laminated, approximately 75% of the utilization efficiency of the rays of light can be achieved in fact due to loss of the recycled light through thermal absorption, reflection and the like.

SUMMARY OF THE INVENTION

The present invention was made in view of these disadvantages, and an object of the invention is to provide a substrate film for an optical sheet, an optical sheet and a backlight unit capable of markedly enhancing utilization efficiency of rays of light and improving luminance.

The present inventor elaborately investigated polarization characteristics of each constituent element of the backlight unit, and consequently found that decrease in utilization efficiency of the rays of light results from polarization components of rays of light outgoing from the optical waveguide plate (or inverse prism sheet laminated on the optical waveguide plate front face) being rich in a vertical orientation to the lamp, and not being consistent with the orientation of the transmission axis of the polarizing plate or the reflection polarizing plate.

Consequently, the present invention made for solving the aforementioned problems is a substrate film for an optical sheet which is a made of a transparent resin and which is formed into a rectangular shape, which substrate film for the optical sheet having an optical anisotropy, and having an absolute value of the angle of the crystal orientation (crystallographic axial orientation) with respect to the short side orientation being $\pi/16$ or greater and $3\pi/16$ or less. Herein, the term "angle of the crystal orientation with respect to the short side orientation" means the angle on the front face, representing the clockwise rotation by "+", and the counterclockwise rotation by "−".

Owing to the substrate film for the optical sheet having an optical anisotropy and having an absolute value of the angle of the crystal orientation with respect to the short side orientation of $\pi/16$ or greater and $3\pi/16$ or less, polarization orientation (meaning the horizontal orientation with maximal polarization components of the rays of light, the same applied hereinbelow) of the rays of light outgoing from the optical waveguide plate (or an inverse prism sheet laminated on the optical waveguide plate front face) can be converted into the transmission axial orientation of the polarizing plate or the reflection polarizing plate. Hence, light components which had been conventionally reflected for recycling can be transmitted efficiently, and thus, utilization efficiency of the rays of light can be enhanced.

The aforementioned crystal orientation preferably follows the phase advancing axial orientation. Decision of the angle with respect to the short side orientation on the basis of the phase advancing axial orientation in such a manner can improve the utilization efficiency of the rays of light to some extent than the decision on the basis of the phase retarding axial orientation.

Provided that a polarizer P is disposed on one face side of the substrate film and an analyzer Q is disposed on another face side of the same, and the linear polarized light that passed through the polarizer P (amplitude=1, intensity of transmitted beam=1) transmits the substrate film and then pass through the analyzer Q, when the phase advancing axial orientation and phase retarding axial orientation of crystallographic axis of the substrate film front face is designated as x orientation and y orientation; the thickness of the substrate film is designated as d, refractive index in the x orientation and the y orientation is designated as nx and ny (nx≠ny); angle between the crystal orientation and the transmission axial orientation of the polarizer P is designated as ψ; and angle between the transmission axial orientation of the polarizer P and the transmission axial orientation of the analyzer Q is designated as β, displacement of the light passed through the analyzer Q is represented by the following mathematical formula (1); intensity of transmitted beam is represented by the following mathematical formula (2); and average intensity of transmitted beams $I_A$ at three wavelengths of RGB is represented by the following mathematical formula (3):

$$E(d,t)=\sin \phi \cos \Theta(d,t)\sin(\beta+\phi)+\cos \phi \cos \{\Theta(d,t)+\delta(d)\} \cos(\beta+\phi) \tag{1}$$

$$I = (1/To)\int_0^{To} E^2 dt \tag{2}$$

$$I_A = (I_1 + I_2 + I_3)/3 \tag{3}$$

wherein, λ is wavelength; c is light velocity; t is time; k is 2π/λ; Θ(d,t) is k(nxd−ct); and δ(d) is k(ny−nx)d. $I_1$, $I_2$ and $I_3$ are intensity of transmitted beam of the light passed through the analyzer Q at a wavelength of the incident light of the polarizer P of $\lambda_1$: 430 nm, $\lambda_2$: 550 nm, $\lambda_3$: 610 nm, respectively, and provided that the polarizer P and the analyzer Q are arranged to give the angles of β being π/4 and ψ being −(β/2), the sheet may have a retardation value such that average intensity of transmitted beam $I_A$ derived from the above mathematical formula (3) becomes equal to or greater than 0.75. Herein, the retardation value Re is derived from the formula of: Re=(ny−nx)d.

The substrate film for the optical sheet having such a retardation value can optimize the phase contrast so that the polarization orientation of the rays of light outgoing from the optical waveguide plate or the like is actively converted into the transmission axial orientation of the polarizing plate or the like, and thus, utilization efficiency of the rays of light can be markedly enhanced.

The aforementioned retardation value is preferably 140 nm or greater and 390 nm or less. By thus providing the retardation value of 140 nm or greater and 390 nm or less, the polarization orientation of the rays of light outgoing from the optical waveguide plate or the like can be effectively converted into the transmission axial orientation of the polarizing plate or the like, and ease in production of the substrate film for the optical sheet can be also achieved favorably.

The aforementioned transparent resin is preferably polyethylene terephthalate or polycarbonate. This polyethylene terephthalate has a property with comparatively high retardation value, therefore, the retardation value can be optimized as described above in an easy and accurate manner. In addition, the retardation value can be readily regulated as for polycarbonate.

The optical sheet of the present invention which was made for solving the problem as described above has the substrate film for an optical sheet, and an optical layer overlaid on one face of this substrate film for the optical sheet. The optical sheet can actively convert the polarization orientation of the rays of light outgoing from the optical waveguide plate or the like into the transmission axial orientation of the polarizing plate or the like by means of the substrate film for the optical sheet. Therefore, when the optical sheet is used in, for example, a liquid crystal display device, utilization efficiency of the rays of light can be markedly enhanced, and thus, high-luminance and energy-saving modeling can be facilitated.

The optical layer may include multiple particles of a light diffusing agent, and a binder therefor. The optical sheet is a light diffusion sheet, generally referred to, has a function to diffuse transmitted rays of light by the multiple transmitted rays of lights included in the optical layer, and can facilitate the high-luminance and energy-saving modeling by means of the substrate film for the optical sheet.

Moreover, the aforementioned optical layer may also have a microlens array constructed with multiple microlenses. The optical sheet is a microlens sheet, generally referred to, has optical functions such as high light condensation of the transmitted rays of light, and refraction and diffusion to the normal line orientation and the like by means of the microlens array. Accordingly, high-luminance and energy-saving modeling can be facilitated by means of the substrate film for the optical sheet.

A sticking preventive layer including beads dispersed in a binder may be provided on another face of the substrate film for the optical sheet. By thus providing the sticking preventive layer on another face of the substrate film for the optical sheet, sticking is prevented in, for example, a liquid crystal display device, between the optical sheet and the optical waveguide plate, the prism sheet or the like disposed to the back face side.

Therefore, in a backlight unit for use in a liquid crystal display device in which rays of light emitted from a lamp are dispersed and lead to the front face side, when the optical sheet is provided, the optical sheet having a function to actively convert the polarization orientation of the rays of light outgoing from the optical waveguide plate or the like into the transmission axial orientation of the polarizing plate or the like markedly enhances utilization efficiency of rays of light emitted from the lamp, and thus, high-luminance, energy-saving, and thin and light modeling which has been socially demanded these days can be facilitated.

As described in the foregoings, the substrate film for an optical sheet and the optical sheet of the present invention have a function to actively convert the polarization orientation of the rays of light outgoing from the optical waveguide plate or the like into the transmission axial orientation of the polarizing plate or the like. Accordingly, the backlight unit of the present invention having such an optical sheet markedly enhances utilization efficiency of the rays of light emitted from the lamp, and thus, high-luminance, energy-saving, and thin and light modeling which has been socially demanded these days can be facilitated.

BRIEF DESCRIPTION OF THE DRAWINGS

FIG. 2 shows a schematic perspective view illustrating a method for measuring polarization anisotropy of out going rays of light of an optical waveguide plate or the like.

FIG. 3 shows a graph illustrating results of measuring polarization anisotropy of outgoing rays of light of the optical waveguide plate or the like.

FIG. 4 shows a graph illustrating results of measuring a polarizing characteristic of outgoing rays of light of the optical waveguide plate or the like.

DESCRIPTION OF THE PREFERRED EMBODIMENTS

Figure 1:
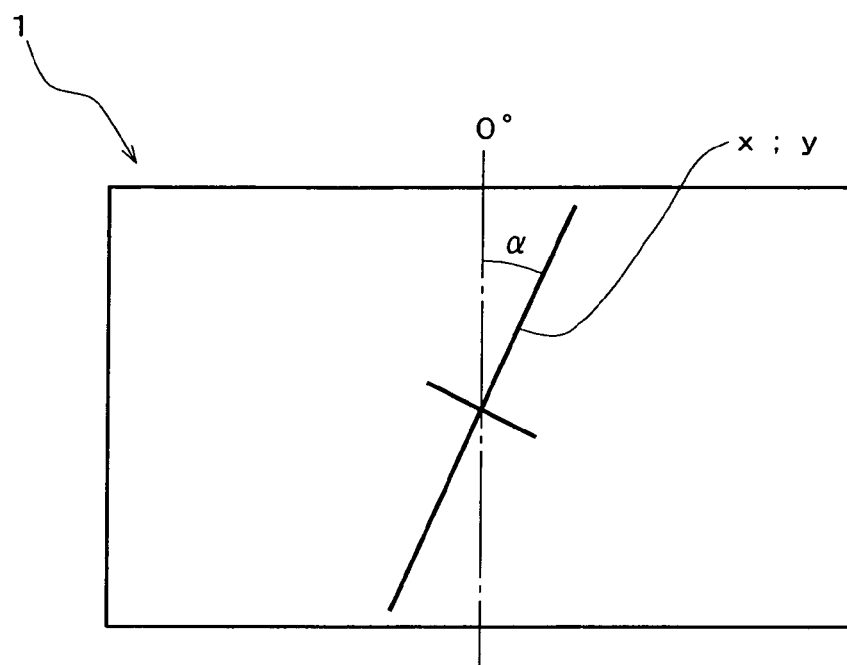
FIG. 1 shows a schematic plan view illustrating a substrate film for an optical sheet according to one embodiment of the present invention.

Hereinafter, embodiments of the present invention will be described in detail with appropriate references to the drawing.

The substrate film 1 for an optical sheet shown in FIG. 1 is a film made of a resin formed into a rectangular shape. As a material for forming the substrate film 1 for the optical sheet, transparent, particularly colorless and transparent synthetic resin is used. This synthetic resin is not particularly limited, and examples thereof include e.g., polyethylene terephthalate, polyethylene naphthalate, acrylic resins, polycarbonate, polystyrene, polyolefin, cellulose acetate, weather resistant vinyl chloride and the like. Among them, polyethylene terephthalate or polycarbonate being highly transparent, having high strength, and capable of readily regulating the retardation value as described later is preferred. Particularly, polyethylene terephthalate having improved flexural performance is preferred.

Thickness of the substrate film 1 for the optical sheet (average thickness) is not particularly limited, but is preferably 10 µm or greater and 250 µm or less, particularly preferably 20 µm or greater and 188 µm or less. When the substrate film 1 for the optical sheet has a thickness being below the above range, disadvantages such as increasing possibility of generation of curling upon coating a polymer composition for forming the light diffusion layer or the like, and difficulty in handling, and the like may be caused. To the contrary, when the substrate film 1 for the optical sheet has a thickness being beyond the above range, luminance of the liquid crystal display device may be lowered, and further may result in increase of thickness of the backlight unit, leading to production of a liquid crystal display device which does not fulfill the demand for thin modeling.

The substrate film 1 for the optical sheet has an optical anisotropy, and specifically, has a birefringence exhibiting different refractive indices in the horizontal orientation. This birefringence enables the substrate film 1 for the optical sheet to convert the polarization orientation of the transmitted rays of light into an intended orientation.

The substrate film 1 for the optical sheet has optimized angle of the crystal orientation and the retardation value. The angle of the crystal orientation and the retardation value of the substrate film 1 for the optical sheet will be explained below by way of experimental measurement and simulation.

Figure 2:
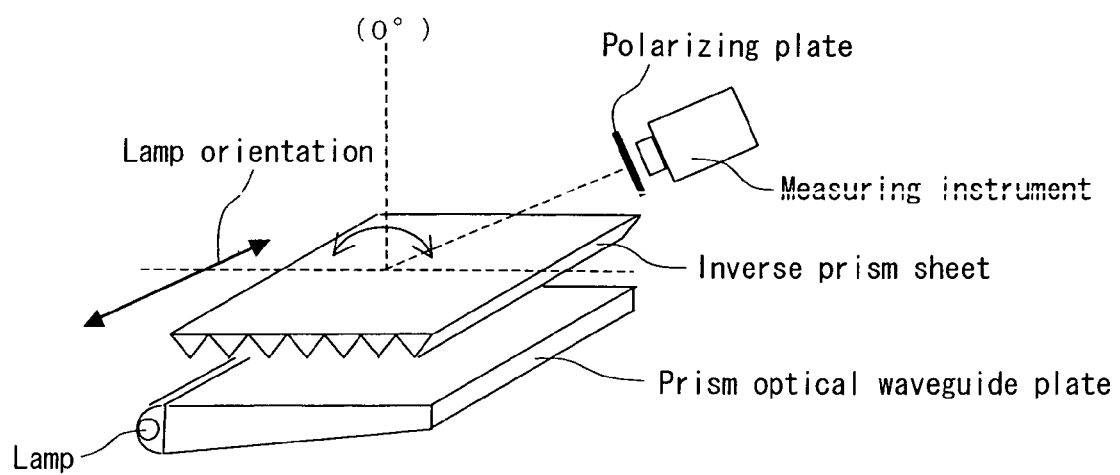

Determination of Anisotropy of Polarization Intensity of Rays of Light Outgoing from Optical Waveguide Plate or the Like As shown in FIG. 2, in case of the edge light type backlight unit having a construction of:
A: a prism optical waveguide plate alone; or
B: a prism optical waveguide plate and an inverse prism sheet, measurement of the angular field luminance of the lamp orientation and the viewing angle was conducted.

Upon the measurement, angle of the polarizing filter of the measuring instrument was regulated to measure:
(1) polarization components in vertical orientation to the lamp (transmission axis of the polarizing plate filter of the measuring instrument being vertical), and
(2) polarization components in parallel orientation to the lamp (transmission axis of the polarizing plate filter of the measuring instrument being parallel). The results are shown in FIG. 3.

Figures 3, 4:
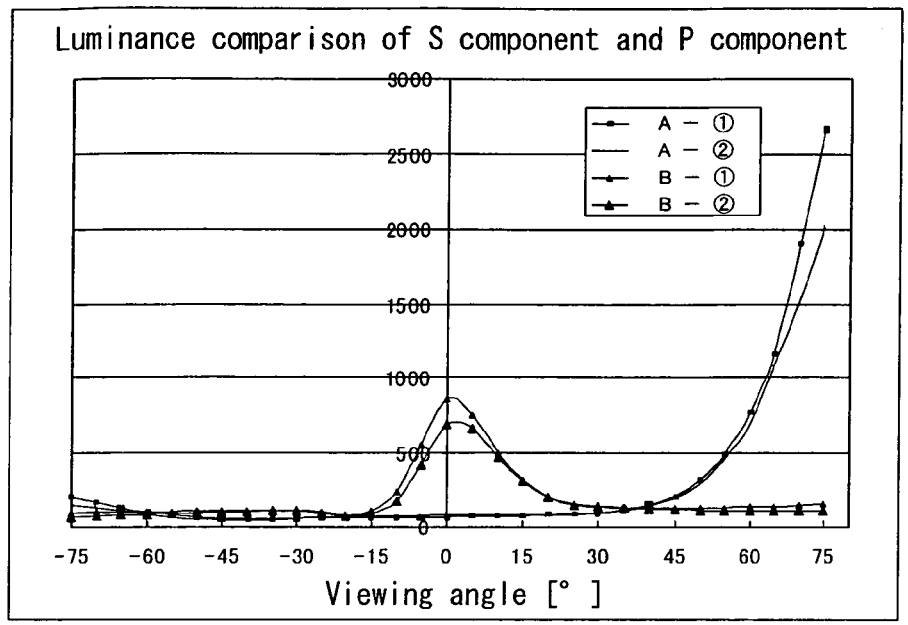

As shown in FIG. 3, in case of A, i.e., when the prism optical waveguide plate alone was incorporated, an outgoing light characteristic was exhibited showing polarization anisotropy being high at approximately 60° to 75° with a large amount of the outgoing light; and showing the polarization components being rich in the vertical orientation to the lamp. Moreover, in case of B, i.e., use of the prism optical waveguide plate and the inverse prism sheet, an outgoing light characteristic was exhibited: showing the polarization anisotropy being high at approximately 0° in the front orientation; and showing the polarization components being rich in the vertical orientation to the lamp.

Verification of Polarizing Characteristics of Rays of Light Outgoing from Optical Waveguide Plate or the like Polarizing characteristics of the rays of light outgoing from the backlight unit having the construction including the optical waveguide plate and the inverse prism sheet as shown in FIG. 2 were verified, and compared with the backlight unit including the normal optical waveguide plate alone. An angle of the orientation that is vertical to the orientation of the lamp was supposed to be 0°, and the polarizing plate was laminated on the backlight unit. Then, the transmission axis of this polarizing plate was rotated in 10-degree steps from the position of 0°, and the front luminance data were determined. Also, the backlight unit having the normal optical waveguide plate alone was similarly subjected to the determination. The results are shown in FIG. 4.

As shown in FIG. 4, as compared with the construction including the normal optical waveguide plate alone, great polarization was verified in the polarization components in both vertical and parallel orientations to the lamp, according to the construction including the prism optical waveguide plate and the inverse prism sheet. Specifically, in the backlight unit having the construction including the prism optical waveguide plate and the inverse prism sheet, polarization of the polarization components was greater by about 20% for the components in the vertical orientation to the lamp as compared with the components in the parallel orientation.

Simulation of Optimization of Crystallographic Axial Angle and Phase Contrast

On the basis of the aforementioned measurement results, calculation of an optimum value of the crystallographic axial angle and phase contrast of the substrate film 1 for the optical sheet is carried out for efficiency converting the polarization orientation of the rays of light outgoing from the optical waveguide plate or the like into the transmission axial orientation of the polarizing plate.

Provided that a polarizer P is disposed on one face side of the substrate film and an analyzer Q is disposed on another face side of the same, and the linear polarized light that passed through the polarizer P (amplitude=1, intensity of transmitted beam=1) transmits the substrate film and then pass through the analyzer Q, when the phase advancing axial orientation and phase retarding axial orientation of crystallographic axis of the substrate film front face is designated as x orientation and y orientation; the thickness of the substrate film is designated as d, refractive index in the x orientation and the y orientation is designated as nx and ny (nx≠ny); angle between the crystal orientation and the transmission axial orientation of the polarizer P is designated as ψ; and angle between the transmission axial orientation of the polarizer P and the transmission axial orientation of the analyzer Q is designated as β, displacement of the light passed through the analyzer Q is represented by the following mathematical formula (1); intensity of transmitted beam is represented by the following mathematical formula (2); and average intensity of transmitted beams $I_A$ at three wavelengths of RGB is represented by the following mathematical formula (3).

Optimum Polarization Axial Angle

Figure 5:
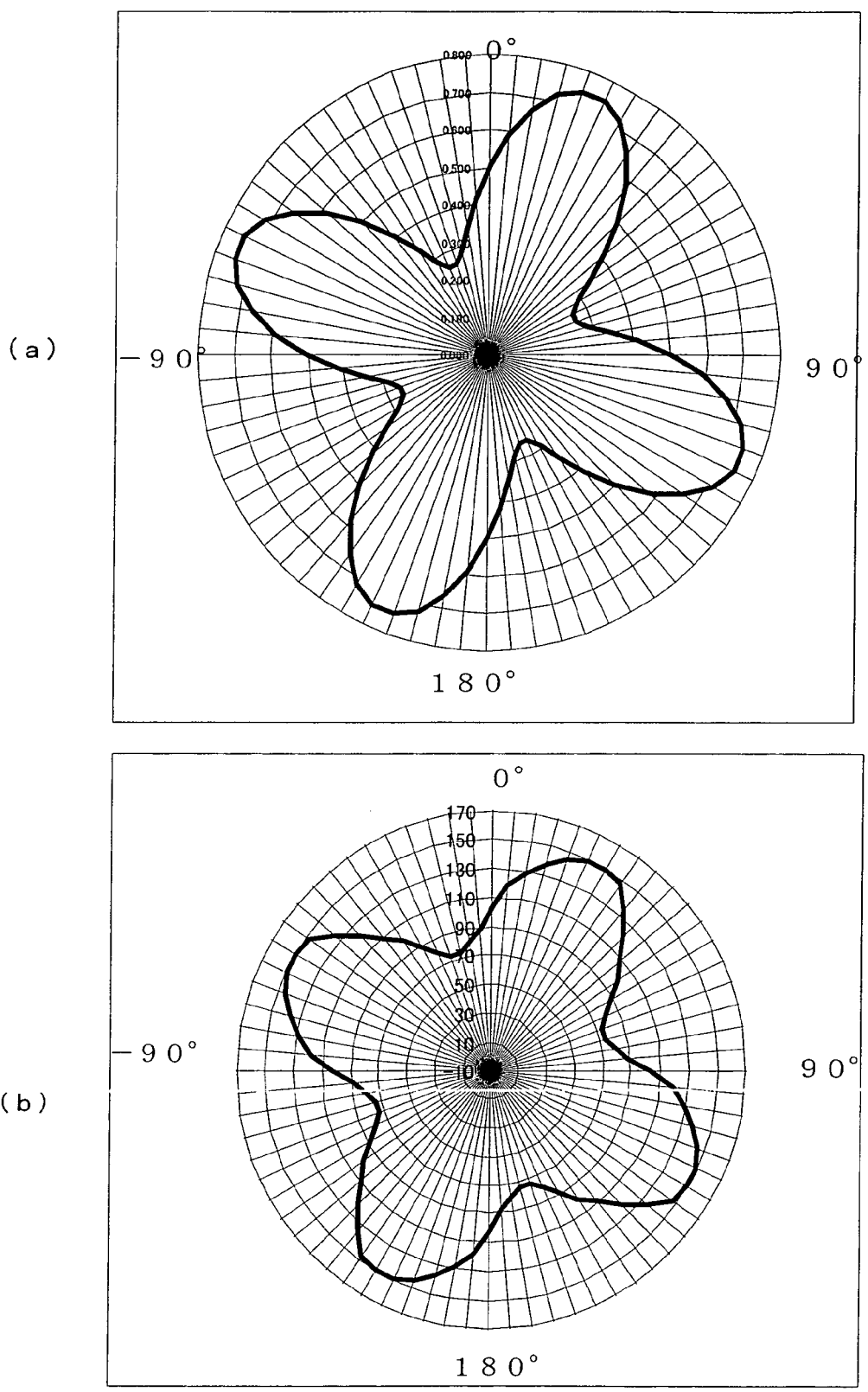
FIGS. 5A and 5B show a graph illustrating results of simulation (5A) and experimental determination (5B) of the relationship between the crystallographic axial angle $\psi$ and the average intensity of transmitted beam $I_4$.

From the aforementioned results, the polarization orientation of the rays of light outgoing from the optical waveguide plate or the like follows the vertical orientation to the lamp orientation, while the transmission axial orientation of general polarizing plates is ±π/4 with respect to the vertical orientation to the lamp orientation. Therefore, in the above mathematical formulae (1), (2) and (3), β was assigned as π/4, and Re was assigned as λ/2. Accordingly, the relationship between ψ and the average intensity of the transmitted beam $I_A$ was determined. The results are shown in FIG. 5A.

Judging from the experimental results in FIG. 5A and "Relationship between Angle α in Crystal Orientation with respect to Short Side Orientation and Front Luminance" described later, in the substrate film 1 for the optical sheet, absolute value of the angle α of the crystal orientation (x, y) with respect to the short side orientation is preferably π/16 or greater and 3π/16 or less, particularly preferably 3π/32 or greater and 5π/32 or less, and most preferably π/8. Specification of the angle α of the crystal orientation in terms of the absolute value as described above was conducted because there may be a case in which the transmission axial orientation of a general polarizing plate is ±π/4 with respect to the vertical orientation to the lamp orientation.

In addition, using the substrate film 1 for the optical sheet having a retardation value of 320, the front luminance was measured by laminating this substrate film 1 for the optical sheet on the backlight unit having the construction including the optical waveguide plate and the inverse prism sheet, and rotating the crystallographic axis. Relationship of thus resulting crystallographic axial angle and the front luminance is shown in FIG. 5B. The relationship between the crystallographic axial angle and the front luminance shown in FIG. 5B indicates consistency with the relationship between ψ and the average intensity of transmitted beam $I_A$ shown in FIG. 5A. Accordingly, it was revealed that the aforementioned crystallographic axial angle simulation was properly performed.

Optimum Retardation Value

Based on the aforementioned measurement results and simulation results, relationship between the average intensity of transmitted beam $I_A$ and the retardation value was determined when disposed at optimum angles β being π/4, and ψ being −(β/2). The results are shown in FIG. 6.

Figure 6:
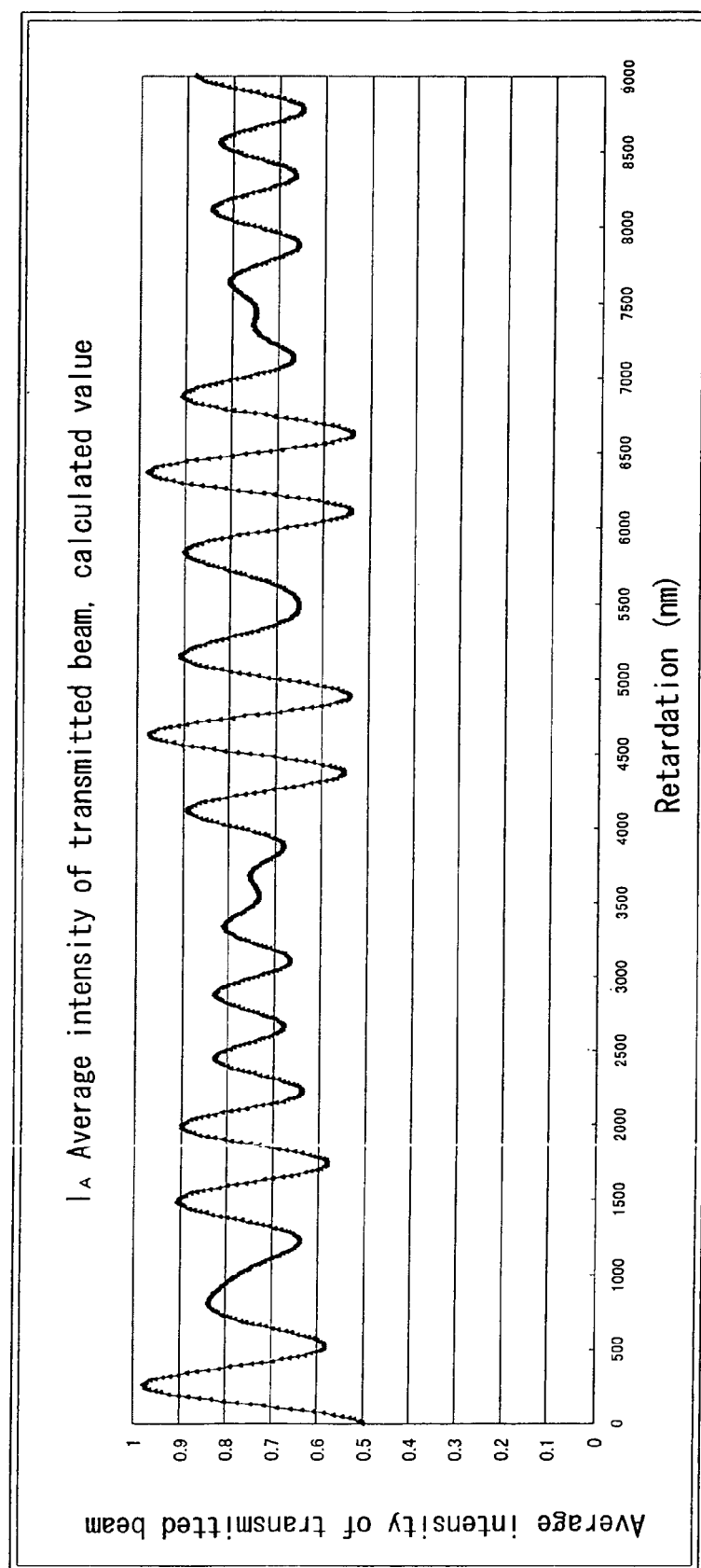
FIG. 6 shows a graph illustrating results of simulation of the relationship between the retardation value and the average intensity of transmitted beam $I_A$.

Judging from FIG. 6, in the substrate film 1 for the optical sheet, the retardation value to yield the average intensity of transmitted beam $I_A$ of 0.75 or greater is preferred; the retardation value to yield the average intensity of transmitted beam $I_A$ of 0.9 or greater is more preferred; and the retardation value to yield the average intensity of transmitted beam $I_A$ of 0.95 or greater is particularly preferred.

Specific retardation value in the substrate film 1 for the optical sheet is, judging from FIG. 6 and the experimental results of "Relationship between Retardation Value and Front Luminance" described later: preferably 140 nm or greater and 390 nm or less, 680 nm or greater and 1040 nm or less, 1350 nm or greater and 1610 nm or less and the like, which yields the average intensity of transmitted beam $I_A$ of 0.75 or greater; particularly preferably 190 nm or greater and 330 nm or less, and further particularly preferably 240 nm or greater and 280 nm or less. By setting the retardation value to fall within such a range, the polarization orientation of the rays of light outgoing from the optical waveguide plate or the like can be effectively converted into the transmission axial orientation of the polarizing plate or the like, and ease in production of the substrate film 1 for the optical sheet can also be favorable.

The aforementioned crystal orientation preferably follows the phase advancing axial orientation. Decision of the angle α with respect to the short side orientation on the basis of the phase advancing axial orientation can improve the utilization efficiency of the rays of light to some extent, and luminance of the backlight unit than the decision thereof on the basis of the phase retarding axial orientation. This was demonstrated by the experimental results of the "Relationship between Phase Advancing Axial Orientation or Phase Retarding Axial Orientation, and Front Luminance" described later.

Process for producing the substrate film 1 for the optical sheet is not particularly limited as long as the crystallographic axial angle and the retardation value as described above can be provided. For example, the crystallographic axial angle can be regulated to fall within the range according to the present invention by adjusting stretching force, temperature and the like in the processing of uniaxial stretching of polyethylene terephthalate or the like, as well as by adjusting the position and angle of punching in the processing of punching of the biaxially stretched film. Moreover, the retardation value can be regulated by way of stretching force, temperature, film thickness or the like in the processing of stretching.

The substrate film 1 for the optical sheet can convert the polarization orientation of the rays of light outgoing from the optical waveguide plate (or inverse prism sheet laminated on the optical waveguide plate front face) into the transmission axial orientation of the polarizing plate or the reflection polarizing plate. Hence, components of the light conventionally reflected for recycling can be transmitted efficiently to improve the utilization efficiency of the rays of light.

Figure 7:
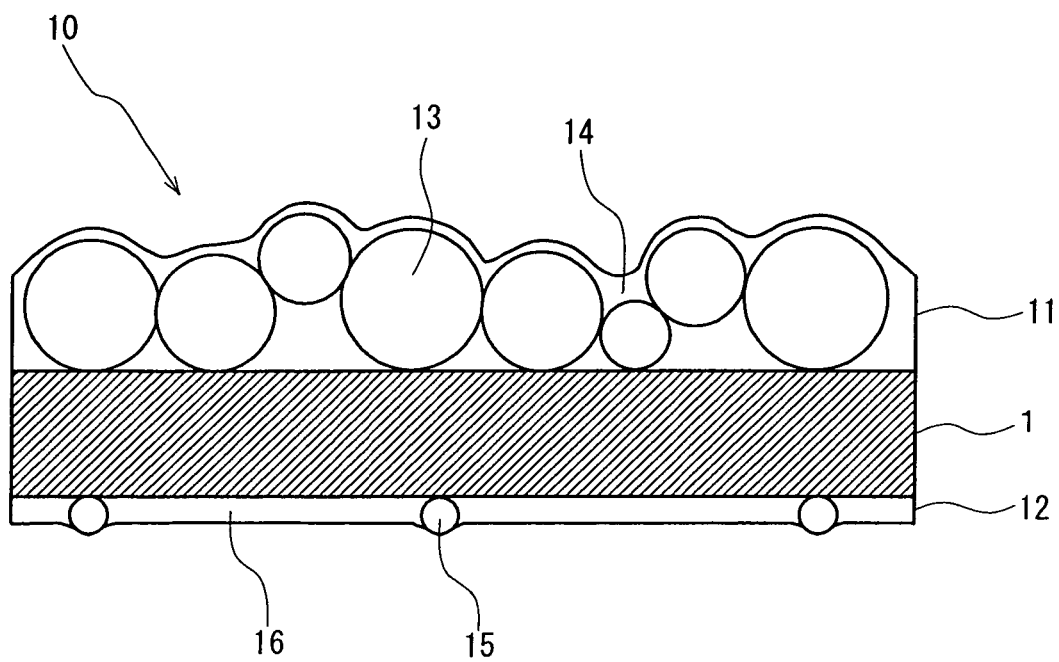
FIG. 7 shows a schematic cross-sectional view illustrating an optical sheet (light diffusion sheet) in which the substrate film for the optical sheet shown in FIG. 1 is used.

The optical sheet 10 shown in FIG. 7 is a light diffusion sheet that has a light diffusion function to allow transmitted rays of light to be diffused (particularly, directional diffusing function to permit light condensing to the normal line orientation side while allowing to be diffused). The optical sheet 10 has the aforementioned substrate film 1 for the optical sheet according to the present invention, an optical layer (light diffusion layer) 11 overlaid on the front face of the substrate film 1 for the optical sheet, and a sticking preventive layer 12 overlaid on the back face of the substrate film 1 for the optical sheet.

The optical layer 11 includes multiple particles of a light diffusing agent 13 provided over the front face of the substrate film 1 for the optical sheet in a substantially uniform manner, and a binder 14 for the multiple particles of the light diffusing agent 13. The multiple particles of the light diffusing agent 13 are covered by the binder 14. The multiple particles of the light diffusing agent 13 included in the optical layer 11 in such a manner enable uniform diffusion of the rays of light which transmit the optical layer 11 from the back side to the front side. Moreover, micro recessions and protrusions are formed on the surface of the optical layer 11 in a substantially uniform manner by the multiple particles of the light diffusing agent 13. Owing to a refracting action of the micro recessions and protrusions like a lens thus formed on the front face of the optical sheet 10, the rays of light can be more efficiently diffused. Although the average thickness of the optical layer 11 is not particularly limited, it may be, for example, approximately 1 μm or greater and 30 μm or less.

The light diffusing agent 13 may be in the form of particles having a property to allow the rays of light to be diffused, and its candidates can be generally classified into inorganic fillers and organic fillers. Examples of the inorganic filler which may be used include e.g., silica, aluminum hydroxide, aluminum oxide, zinc oxide, barium sulfide, magnesium silicate, or any mixtures thereof. Examples of the material which may be used for the organic filler include e.g., acrylic resins, acrylonitrile resins, polyurethane, polyvinyl chloride, polystyrene, polyacrylonitrile, polyamide and the like. Among them, acrylic resins having high transparency are preferred, and in particular, polymethyl methacrylate (PMMA) is preferred.

Shape of the light diffusing agent 13 is not particularly limited, and examples thereof include e.g., spherical, spindle, needle-like, rod-like, cubic, plate-like, squamous, fibrous and the like. In particular, the shape of spherical beads excellent in the light diffusibility is preferred.

The lower limit of the average particle size of the light diffusing agent 13 is preferably 1 μm, particularly preferably 2 μm, and still more preferably 5 μm. In contrast, the upper limit of the mean particle size of the light diffusing agent 13 is preferably 50 μm, particularly preferably 20 μm, and still more preferably 15 μm. When the mean particle size of the light diffusing agent 13 is below the above range, less recessions and protrusions are provided on the surface of the optical layer 11 formed by the light diffusing agent 13, involving the probability of unsatisfactory light diffusing property required for the light diffusion sheet. To the contrary, when the mean particle size of the light diffusing agent 13 is beyond the above upper range, thickness of the optical sheet 10 is increased, and uniform diffusion may be difficult.

It is preferred that the lower limit of the amount of the light diffusing agent 13 (incorporated amount per 100 parts of the substrate polymer in the polymer composition being the material for forming the binder 14, which is calculated on the basis of the solid content) be 10 parts, particularly 20 parts, and still more 50 parts, and that the upper limit of the incorporated amount be 500 parts, particularly 300 parts, and still more 200 parts. The amount of the incorporated light diffusing agent 13 below the above range may result in insufficient light diffusibility, while the amount of the incorporated light diffusing agent 13 beyond the above range, to the contrary, may result in deterioration of the effect of fixing the light diffusing agent 13. High light diffusibility is not required in case of so called light diffusion sheets for upper use disposed to the front face side of the prism sheet, therefore, the amount of the incorporated light diffusing agent 13 may be preferably 10 parts or greater and 40 parts or less, particularly preferably 10 parts or greater and 30 parts or less.

The binder 14 can be formed by allowing a polymer composition containing a substrate polymer to be cross-linked and cured. This binder 14 disposes and fixes the light diffusing agent 13 on the front face of the substrate film 1 for the optical sheet in a manner to provide substantially uniform density. Furthermore, for example, a fine inorganic filler, a curing agent, a plasticizer, a dispersant, any of various levelling agents, an ultraviolet ray-absorbing agent, an anti-oxidizing agent, a viscosity improving agent, a lubricant, a light stabilizer and the like may be blended ad libitum in the polymer composition for forming the binder 14, in addition to the substrate polymer.

The aforementioned substrate polymer is not particularly limited, and examples thereof include e.g., acrylic resins, polyurethane, polyesters, fluorine based resins, silicone based resins, polyamide imide, epoxy resins, ultraviolet-curable resins and the like. One or two or more of these polymers may be used as a mixture. Particularly, a highly processable polyol that can be readily formed into the optical layer 11 by a means such as coating or the like is preferred as the substrate polymer. Furthermore, the substrate polymer per se which may be used for the binder 14 is preferably transparent, and particularly preferably transparent and colorless in light of improvement of the transmittivity of the rays of light.

Examples of the polyol include e.g., polyols obtained by polymerizing a monomer component including a hydroxyl group-containing unsaturated monomer, polyester polyols obtained under a condition with excessive hydroxyl groups present, and the like. These may be used alone or two or more of them may be used as a mixture.

Examples of the hydroxyl group-containing unsaturated monomer include (a) hydroxyl group-containing unsaturated monomers such as e.g., 2-hydroxyethyl acrylate, 2-hydroxypropyl acrylate, 2-hydroxyethyl methacrylate, 2-hydroxypropyl methacrylate, allyl alcohol, homoallyl alcohol, cinnamic alcohol, and crotonyl alcohol, and (b) hydroxyl group-containing unsaturated monomers obtained by a reaction of a dihydric alcohol or an epoxy compound such as e.g., ethylene glycol, ethylene oxide, propylene glycol, propylene oxide, butylene glycol, butylene oxide, 1,4-bis(hydroxymethyl)cyclohexane, phenylglycidyl ether, glycidyl decanoate or PRACCEL FM-1 (manufactured by Daicel Chemical Industries, Ltd.), with an unsaturated carboxylic acid such as e.g., acrylic acid, methacrylic acid, maleic acid, fumaric acid, crotonic acid or itaconic acid. The polyol can be manufactured by polymerizing one or two or more selected from these hydroxyl group-containing unsaturated monomers.

Moreover, the polyol can be also manufactured by polymerizing one or two or more ethylenic unsaturated monomers selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, tert-butyl methacrylate, ethylhexyl methacrylate, glycidyl methacrylate, cyclohexyl methacrylate, styrene, vinyltoluene, 1-methylstyrene, acrylic acid, methacrylic acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetone acrylamide, ethylene, propylene, isoprene and the like, with the hydroxyl group-containing unsaturated monomer selected from those in the above (a) and (b).

The polymer obtained by polymerizing the monomer component including the hydroxyl group-containing unsaturated monomer may have a number average molecular weight of 1000 or greater and 500000 or less, and preferably 5000 or greater and 100000 or less. Furthermore, the hydroxyl value may be 5 or greater and 300 or less, preferably 10 or greater and 200 or less, and more preferably 20 or greater and 150 or less.

The polyester polyol obtained under a condition with excessive hydroxyl groups being present can be manufactured by allowing a reaction of (c) a polyhydric alcohol such as e.g., ethylene glycol, diethylene glycol, propylene glycol, dipropylene glycol, 1,3-butanediol, 1,4-butanediol, 1,5-pentanediol, neopentyl glycol, hexamethylene glycol, decamethylene glycol, 2,2,4-trimethyl-1,3-pentanediol, trimethylolpropane, hexanetriol, glycerin, pentaerythritol, cyclohexanediol, hydrogenated bisphenol A, bis(hydroxymethyl)cyclohexane, hydroquinone bis(hydroxyethyl ether), tris(hydroxyethyl)isocyanurate or xylylene glycol with (d) a polybasic acid such as e.g., maleic acid, fumaric acid, succinic acid, adipic acid, sebacic acid, azelaic acid, trimellitic acid, terephthalic acid, phthalic acid or isophthalic acid, under a condition in which number of the hydroxyl groups in the polyhydric alcohol such as propanediol, hexanediol, polyethylene glycol, trimethylolpropane or the like is greater than number of the carboxy groups of the aforementioned polybasic acid.

Number average molecular weight of the polyester polyol obtained under the condition with excessive hydroxyl groups being present may be 500 or greater and 300000 or less, and more preferably 2000 or greater and 100000 or less. Additionally, the hydroxyl value may be 5 or greater and 300 or less, preferably 10 or greater and 200 or less, and more preferably 20 or greater and 150 or less.

The polyol for use as the substrate polymer of the polymer composition may be preferably an acryl polyol which is obtained by polymerizing the aforementioned polyester polyol, and a monomer component comprising the hydroxyl group-containing unsaturated monomer, and which has a (meth)acrylic unit or the like. The binder 14 including the polyester polyol or acryl polyol as the substrate polymer is highly weather-resistant, and yellowing of the optical layer 11 and the like can be suppressed. Either one of this polyester polyol or the acryl polyol may be used, alternatively, both of them may be used.

Number of the hydroxyl groups in the polyester polyol and the acryl polyol is not particularly limited as long as it is two or more per molecule, however, when the hydroxyl value in the solid content is equal to or less than 10, crosslinking points may be reduced and thus, film physical properties such as solvent resistance, water resistance, heat resistance, surface hardness and the like are liable to be decreased.

A fine inorganic filler may be included in the polymer composition that forms the binder 14. By including the fine inorganic filler in the binder 14, heat resistance of the optical layer 11, and in turn, of the optical sheet 10 may be improved. Inorganic matter that constitutes this fine inorganic filler is not particularly limited, but an inorganic oxide is preferred. This inorganic oxide is defined as any one of a variety of oxygen-containing metal compounds in which a metal element forms a three dimensional network predominantly via bonds with an oxygen atom. The metal element that constitutes the inorganic oxide is preferably an element selected from, for example, those in the group II-VI of the periodic table of the elements, and more preferably an element selected from those in the group III-V of the periodic table of the elements. Particularly, an element selected from Si, Al, Ti and Zr is preferred. Colloidal silica in which the metal element is Si is most preferred as the fine inorganic filler in terms of the effect to improve the heat resistance and uniform dispersibility. Also, the shape of the fine inorganic filler is not particularly limited, but may be an optional particle shape such as spherical, needle-like, plate-like, squamous, granular or the like.

The lower limit of the mean particle size of the fine inorganic filler is preferably 5 nm, and particularly preferably 10 nm. In contrast, the upper limit of the mean particle size of the fine inorganic filler is preferably 50 nm, and particularly preferably 25 nm. When the mean particle size of the fine inorganic filler is below the above range, surface energy of the fine inorganic filler becomes so high that aggregation or the like may be liable to occur. To the contrary, the mean particle size of the fine inorganic filler being beyond the above range may cause white turbidity due to the influences of the short-wavelength, leading to failure in completely maintaining the transparency of the optical sheet 10.

The lower limit of the amount of the fine inorganic filler (amount of the incorporated inorganic substance component alone) per 100 parts by weight of the substrate polymer is preferably 5 parts, and particularly preferably 50 parts calculated on the basis of the solid content. In contrast, the upper limit of the amount of the incorporated fine inorganic filler is preferably 500 parts, more preferably 200 parts, and particularly preferably 100 parts. When the amount of the incorporated fine inorganic filler is below the above range, the optical sheet 10 may not develop heat resistance enough, to the contrary, when the amount is beyond the above range, blending in the polymer composition may be difficult, which may result in lowering of the light transmissivity of the optical layer 11.

As the fine inorganic filler, one having an organic polymer fixed on the surface thereof may be used. By thus using the organic polymer-fixed fine inorganic filler, improvement of dispersibility in the binder 14 and affinity with the binder 14 may be contemplated. This organic polymer is not particularly limited with respect to the molecular weight, shape, composition, presence of the functional group and the like, but an arbitrary organic polymer may be used. Furthermore, in connection with the shape of the organic polymer, any arbitrary shape such as a straight, branched or crosslinked structure may be used.

Specific examples of the resin constituting the organic polymer include e.g., (meth)acrylic resins, polystyrene, polyvinyl acetate, polyolefin such as polyethylene and polypropylene, polyvinyl chloride, polyvinylidene chloride, polyesters such as polyethylene terephthalate, copolymers of the same as well as these resins partially modified with a functional group such as an amino group, an epoxy group, a hydroxyl group or a carboxyl group, and the like. Among them, those including an organic polymer which contains a (meth)acrylic unit such as a (meth)acrylic resin, a (meth) acryl-styrene based resin or a (meth)acryl-polyester based resin as an essential component are suited because of their film formation ability. On the other hand, resins having miscibility with the substrate polymer of the aforementioned polymer composition are preferred, therefore, one having the same composition as the substrate polymer included in the polymer composition is most preferred.

The fine inorganic filler may include an organic polymer within the fine particle. Accordingly, adequate softness and toughness can be imparted to the inorganic substance that is a core of the fine inorganic filler.

As the organic polymer, one containing an alkoxy group may be preferably used, with the content of the same being 0.01 mmol or grater and 50 mmol or less per gram of the fine inorganic filler to which the organic polymer was fixed. Such an alkoxy group can improve affinity with a matrix resin that constitutes the binder 14, and dispersibility in the binder 14.

The alkoxy group described above means an RO group bound to a metal element that forms the skeleton of the fine particle. R herein represents an alkyl group which may be substituted, and the RO group in the fine particle may be the same or different. Specific examples of R include methyl, ethyl, n-propyl, isopropyl, n-butyl and the like. It is preferred that a metal alkoxy group be used which includes the same metal as that constituting the fine inorganic filler. When the fine inorganic filler is colloidal silica, an alkoxy group including silicon as the metal may be preferably used.

Although percentage content of the organic polymer in the fine inorganic filler to which the organic polymer was fixed is not particularly limited, its content is preferably equal to or greater than 0.5% by weight and equal to or less than 50% by weight based on the fine inorganic filler.

It is preferred that an organic polymer having a hydroxyl group is used as the organic polymer to be fixed on the fine inorganic filler, and that at least one selected from polyfunctional isocyanate compounds having two or more functional groups that react with a hydroxyl group, melamine compounds and aminoplast resins is included in the polymer composition that constitutes the binder 14. Accordingly, the fine inorganic filler and the matrix resin of the binder 14 are bound via a crosslinking structure, leading to excellent stability upon preservation, stain resistance, flexibility, weather resistance and the like. Furthermore, the resulting coated film can be glossy.

As the aforementioned substrate polymer, a polyol having a cycloalkyl group is preferred. By thus introducing a cycloalkyl group into the polyol as the substrate polymer constituting the binder 14, hydrophobicity of the binder 14 may be elevated to improve water repellency, water resistance and the like. Accordingly, deflection resistance, size stability and the like of the optical sheet 10 under high temperature and high humidity conditions can be improved. Additionally, basic film coating performances such as weather resistance, hardness, bulky feeling, solvent resistance and the like of the optical layer 11 may be improved. Moreover, affinity with the fine inorganic filler to which the organic polymer was fixed on the surface thereof, and uniform dispersibility of the fine inorganic filler may be further favorable.

The cycloalkyl group is not particularly limited, and examples thereof include e.g., cyclobutyl groups, cyclopentyl groups, cyclohexyl groups, cycloheptyl groups, cyclooctyl groups, cyclononyl groups, cyclodecyl groups, cycloundecyl groups, cyclododecyl groups, cyclotridecyl groups, cyclotetradecyl groups, cyclopentadecyl groups, cyclohexadecyl groups, cycloheptadecyl groups, cyclooctadecyl groups and the like.

The polyol having the cycloalkyl group is obtained by copolymerization of a polymerizable unsaturated monomer having a cycloalkyl group. Such a polymerizable unsaturated monomer having a cycloalkyl group is a polymerizable unsaturated monomer having at least one cycloalkyl group within the molecule. This polymerizable unsaturated monomer is not particularly limited, and examples thereof include e.g., cyclohexyl(meth)acrylate, methylcyclohexyl(meth) acrylate, tert-butylcyclohexyl(meth)acrylate, cyclododecyl (meth)acrylate and the like.

Also, isocyanate may be included as a curing agent in the polymer composition. By thus including the isocyanate curing agent in the polymer composition, even more rigid crosslinking structure is provided, thereby further improving the physical film properties of the optical layer 11. Similar substance to the polyfunctional isocyanate compound as described above may be used as the isocyanate. Among all, aliphatic isocyanate is preferred which prevents the coated film from yellowing.

Particularly, when the polyol is used as the substrate polymer, any one of hexamethylene diisocyanate, isophorone diisocyanate and xylene diisocyanate, or two or more thereof as a mixture may be used as the curing agent to be blended in the polymer composition. When such a curing agent is used, velocity of the curing reaction of the polymer composition is elevated, therefore, lowering of the velocity of the curing reaction due to the cationic antistatic agent can be sufficiently compensated even though a cationic substance that is responsible for dispersion stability of the fine inorganic filler is used as the antistatic agent. Also, elevation of the velocity of the curing reaction of the polymer composition is responsible for uniform dispersibility of the fine inorganic filler in the binder. As a consequence, the optical sheet 10 can markedly suppress deflection and yellowing due to heat, ultraviolet ray and the like.

Furthermore, an antistatic agent may be blended and kneaded in the polymer composition. Through forming a binder 14 from the polymer composition blended and kneaded with the antistatic agent in such a manner, the optical sheet 10 exerts an antistatic effect, thereby enabling the prevention of disadvantages resulting from electrification with static electricity such as attraction of dust, getting into a difficulty in overlaying with a prism sheet or the like, and the like. Moreover, although coating the antistatic agent on a surface results in stickiness or pollution of the surface, such negative effects may be reduced by blending and kneading it in the polymer composition. This antistatic agent is not particularly limited, and examples thereof which may be used include e.g., anionic antistatic agents such as alkyl sulfate, alkyl phosphate and the like; cationic antistatic agents such as quaternary ammonium salts, imidazoline compounds and the like; nonionic antistatic agents such as polyethyleneglycol based compounds, polyoxyethylene sorbitan monostearate esters, ethanol amides and the like; polymeric antistatic agents such as polyacrylic acid, and the like. Among them, cationic antistatic agents are preferred having comparatively strong antistatic effects, which may exert an anti-static effect by merely adding in a small amount.

The sticking preventive layer 12 includes multiple beads 15 disposed on the back face of the substrate film 1 for the optical sheet, and a binder 16 for the multiple beads 15. This binder 16 is also formed by crosslinking and curing a polymer composition which is similar to one for the binder 14 of the optical layer 11 as described above. Moreover, as the material for the beads 15, similar ones to the light diffusing agent 13 for the optical layer 11 may be used. In addition, the thickness of the sticking preventive layer 12 (the thickness of the binder 16 portion, at a part where the beads 15 are not present) is not particularly limited, however for example, it is set to be around 1 µm or greater and 10 µm or less.

The amount of the incorporated beads 15 is set to be relatively small. The beads 15 are dispersed in the binder 16 spacing apart with each other. In addition, protrusions are formed on the under surface of the optical sheet 10 at the parts where the beads 15 are present. Thus, when this optical sheet 10 is disposed to overlay the optical waveguide plate, the protruded portions of the beads 15 are brought into contact with the surface of the optical waveguide plate or the like, and thus contact of the entire surface of the back face of the optical sheet 10 with the optical waveguide plate or the like is avoided. Sticking between the optical sheet 10 and the optical waveguide plate is thereby prevented, leading to suppression of the lack in uniformity of the brightness of the window of a liquid crystal display device.

Next, process for producing the optical sheet 10 will be explained below. The process for producing the optical sheet 10 comprises: (a) a step of preparing a composition for the optical layer through admixing the light diffusing agent 13 with a polymer composition that constitutes the binder 14; (b) a step of overlaying and curing the polymer composition for the optical layer on the front face of the substrate film 1 for the optical sheet to form the optical layer 11; (c) a step of preparing a composition for the sticking preventive layer through admixing beads 15 with a polymer composition that constitutes the binder 16; and (d) a step of overlaying and curing the composition for the sticking preventive layer on the back face of the substrate film 1 for the optical sheet to laminate the sticking preventive layer 12. Means for overlay to laminate the composition for the optical layer and the composition for the sticking preventive layer on the substrate film 1 for the optical sheet is not particularly limited, but, for example, coating in which a bar coater, a blade coater, a spin coater, a roll coater, a gravure coater, a flow coater, a spray, screen printing or the like is used may be employed.

The optical sheet 10 has an excellent light diffusion function (directional light diffusion function) due to the reflection and refraction at the interface of the light diffusing agent 13 included in the optical layer 11, and the refraction on the micro recessions and protrusions formed on the front face of the optical layer 11. In addition, the optical sheet 10 can actively convert the polarization orientation of the rays of light outgoing from the optical waveguide plate or the like into the transmission axial orientation of the polarizing plate or the like by means of the substrate film 1 for the optical sheet. Therefore, the optical sheet 10 can markedly enhance utilization efficiency of the rays of light emitted from the lamp when it is used in, for example, a liquid crystal display device, and thus, high-luminance and energy-saving modeling, as well as space-saving modeling can be facilitated.

Figure 8:
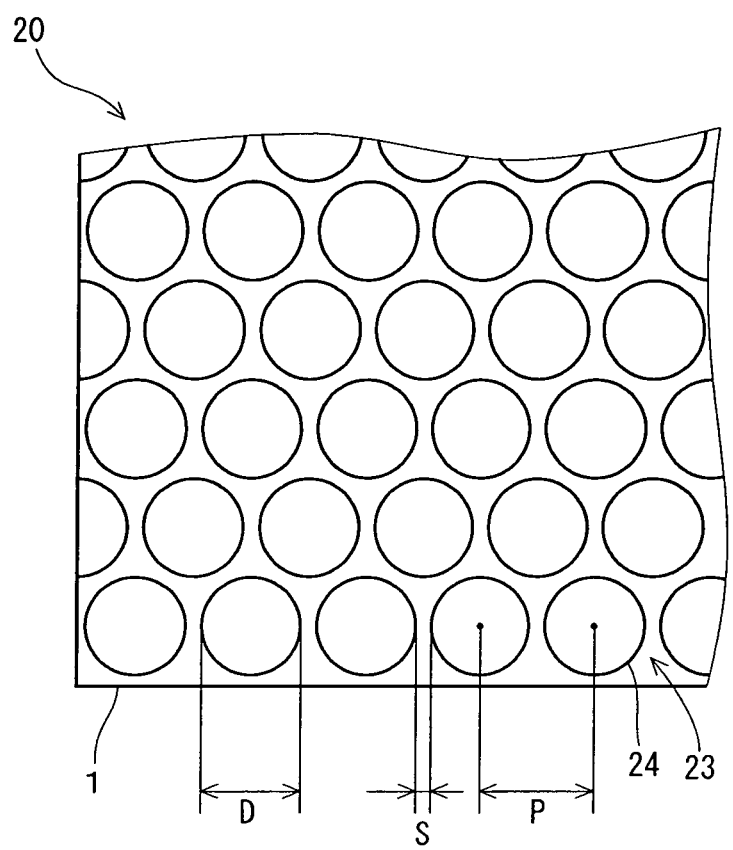
FIGS. 8A and 8B show a schematic plan view (8A) and a schematic cross-sectional view (8B) illustrating an optical sheet (microlens sheet) in which the substrate film for the optical sheet shown in FIG. 1 is used.
Figure 8:
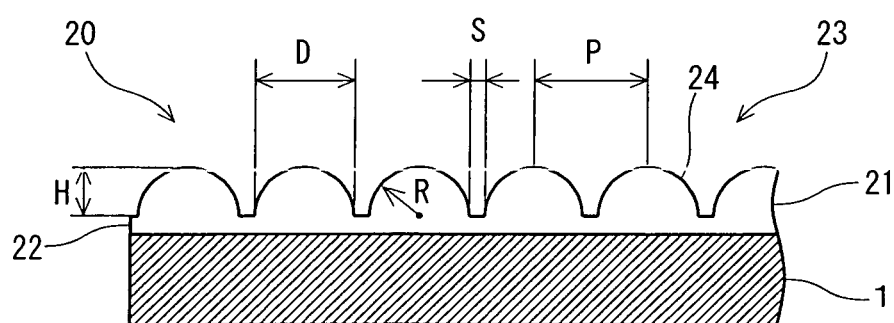
Figure 9:
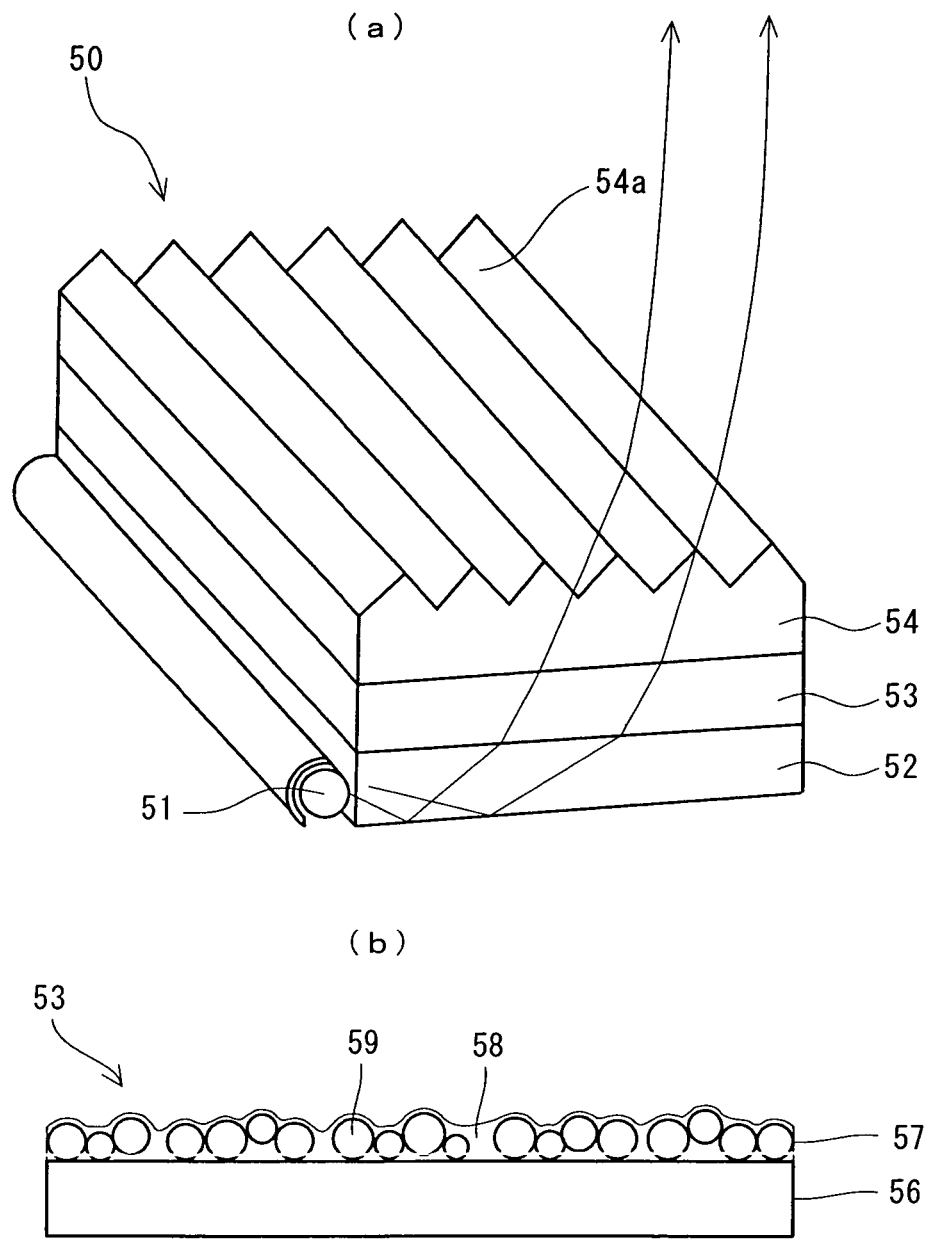
FIGS. 9A and 9B show a schematic perspective view (9A) illustrating a general edge light type backlight unit, and a schematic cross-sectional view (9B) illustrating a general light diffusion sheet.

The optical sheet 20 shown in FIG. 8 is a so called microlens sheet having optical functions such as high light condensation, and refraction and diffusion toward the side of the normal line orientation. The optical sheet 20 has the substrate film 1 for the optical sheet, and an optical layer 21 overlaid on the front face of the substrate film 1 for the optical sheet.

The optical layer 21 has a sheet-shaped part 22 overlaid on the front face of the substrate film 1 for the optical sheet, and a microlens array 23 formed on the front face of the sheet-shaped part 22. The optical layer 21 can be constructed with only the microlens array 23 without providing the sheet-shaped part 22. In other words, it is also possible to form the microlens array 23 directly on the front face of the substrate film 1 for the optical sheet.

The optical layer 21 is formed from a transparent, particularly, colorless and transparent synthetic resin, because transmission of rays of light is required. Examples of the synthetic resin which may be used for the optical layer 21 include e.g., polyethylene terephthalate, polyethylene naphthalate, acrylic resins, polycarbonate, polystyrene, polyolefin, cellulose acetate, weather resistant vinyl chloride, active energy beam curable resins, and the like. Among them, radiation curable resins such as ultraviolet ray curable resins, electron beam curable resins and the like being excellent in formability of the microlens array 23, as well as polyethylene terephthalate having excellent transparency and high strength are particularly preferred. In the optical layer 21 may be blended, for example, a filler, a plasticizer, a stabilizer, an antidegradant, a dispersant and the like, in addition to the aforementioned synthetic resin.

The microlens array 23 is constructed with a number of microlenses 24. This microlens 24 has a hemi-spherical shape (including the shape approximately to a hemisphere), and is provided to protrude on the front face side of the substrate film 1 for the optical sheet. The microlens 24 is not limited to the aforementioned hemi-spherical convex lens, but the microlens being a hemi-spherical concave lens is also acceptable. Such a microlens being the hemi-spherical concave lens also has excellent optical functions similarly to the microlens 24 as described above.

The microlenses 24 are arranged on the front face of the substrate film 1 for the optical sheet in a comparatively dense and geometrical manner. Specifically, the microlenses 24 are arranged on the front face of the substrate film 1 for the optical sheet in a regular triangular lattice pattern. Therefore, pitches (P) of the microlenses 24, and distances (S) between the lenses have entirely constant values, respectively. This arrangement pattern enables the microlenses 24 to be arranged in a most dense manner. The arrangement pattern of the microlenses 24 is not limited to the aforementioned regular triangular lattice pattern which enables dense filling but, for example, any of regular tetragonal lattice patterns and random patterns can also be employed. According to this random pattern, appearance of the moire can be reduced which may be caused when the optical sheet 20 overlaid on other optical member.

It is preferred that the lower limit of the diameter (D) of the microlens 24 is 10 µm, particularly 100 µm, and further particularly 200 µm. In contrast, the upper limit of the diameter (D) of the microlens 24 is preferably 1000 µm, and particularly preferably 700 µm. When the diameter (D) of the microlens 24 is smaller than 10 µm, diffraction may greatly affect to facilitate the occurrence of decrement of the optical performances and color separation, thereby leading to deterioration of the quality. To the contrary, when the microlens 24 has a diameter (D) of greater than 1000 µm, increase in the thickness and lack in uniformity of the luminance are liable to be caused, which may thereby lead to deterioration of the quality. In addition, by setting the diameter (D) of the microlens 24 to be equal to or greater than 100 μm, the microlenses 24 decrease in number per unit area. Consequently, enlargement of the planar dimension of the optical sheet 20 being the microlens sheet can be readily performed, and thus, technical and economic burdens in production can be reduced.

The lower limit of surface roughness (Ra) of the microlens 24 is preferably 0.01 μm, and particularly preferably 0.03 μm. In contrast, the upper limit of the surface roughness (Ra) of the microlens 24 is preferably 0.1 μm, and particularly preferably 0.07 μm. By thus setting the surface roughness (Ra) of the microlens 24 to be equal to or greater than the above lower limit, formation of the microlens array 23 of the optical sheet 20 is comparatively facilitated, and thus, technical and economic burdens in terms of the production can be reduced. To the contrary, by setting the surface roughness (Ra) of the microlens 24 to be less than the above upper limit, scattering of the light on the front face of the microlens 24 is decreased. Consequently, a light condensing function and a refraction function to the side of the normal line orientation by the microlens 24 are enhanced, and high luminance of the front orientation can be achieved resulting from such favorable optical functions.

The lower limit of the height ratio (H/R) of the height (H) of the microlens 24 to the height (R) of the curvature radius is preferably 5/8, and particularly preferably 3/4. In contrast, the upper limit of this height ratio (H/R) is preferably 1. By thus making the height ratio (H/R) of the microlens 24 fall within the above range, a lens-like refracting action in the microlens 24 is effectively exhibited, and the optical functions such as light condensation and the like of the optical sheet 20 can be markedly enhanced.

The upper limit of the spacing ratio (S/D) of the distance (S; P–D) between the lenses to the diameter (D) of the microlenses 24 is preferably 1/2, and particularly preferably 1/5. By thus setting the spacing ratio (S/D) of the microlenses 24 to be equal to or less than the above upper limit, flat part which is not responsible for the optical functions can be decreased, and thus, the optical functions such as light condensation and the like of the optical sheet 20 can be markedly improved.

The lower limit of the filling rate of the microlens 24 is preferably 40%, and particularly preferably 60%. By thus setting the filling rate of the microlens 24 to be equal to or greater than the above lower limit, occupied area of the microlens 24 in the front face of the optical sheet 20 can be increased, and thus, the optical functions such as light condensation and the like of the optical sheet 20 can be markedly improved.

Numerical ranges of the aforementioned height ratio (H/R), spacing ratio (S/D) and filling rate were deduced on the basis of luminance analysis simulation by nonsequential tracing of the rays of light using a Monte Carlo method.

The lower limit of the refractive index of the material constituting the optical layer 21 is preferably 1.3, and particularly preferably 1.45. In contrast, the upper limit of the refractive index of this material is preferably 1.8, and particularly preferably 1.6. Within this range, the refractive index of the material constituting the optical layer 21 is most preferably 1.5. By thus making the refractive index of the material constituting the optical layer 21 fall within the above range, a lens-like refracting action in the microlens 24 is effectively exhibited, and the optical functions such as light condensation and the like of the optical sheet 20 can be further enhanced.

Process for producing the optical sheet 20 is not particularly limited as long as one having the constitution as described above can be formed, and any of various processes can be adopted. Specific examples of the process for producing the optical sheet 20 include those in the followings:

(a) a process for forming the optical sheet 20 by laminating a synthetic resin and the substrate film 1 for the optical sheet in this order in a sheet mold having an inverted shape of the front face of the microlens array 23, and stripping the sheet mold;

(b) a process in which a resin formed into a sheet is heated again, which is sandwiched between a metal plate and a mold having an inverted shape of the front face of the microlens array 23, together with the substrate film 1 for the optical sheet, and then they are pressed to transfer the shape;

(c) an extrusion sheet forming process in which a molten resin and the substrate film 1 for the optical sheet are passed through a nip between a roll mold having, on its inner circumference, an inverted shape of the front face of the microlens array 23 and another roll to transfer the shape;

(d) a process in which an ultraviolet ray curable resin is coated on the substrate film 1 for the optical sheet, pressed on a sheet mold, a mold or a roll mold having the inverted shape that is similar to the aforementioned one to transfer the shape to the uncured ultraviolet ray curable resin, and then the ultraviolet ray curable resin is exposed to an ultraviolet ray to permit curing;

(e) a process in which an uncured ultraviolet ray curable resin is filled for coating in a mold or a roll mold having the inverted shape that is similar to the aforementioned one, pressing it with the substrate film 1 for the optical sheet to be uniform, and then the ultraviolet ray curable resin is exposed to an ultraviolet ray to permit curing;

(f) a process in which an uncured (liquid) ultraviolet ray curable resin or the like is sprayed or discharged from a minute nozzle such that the microlenses 24 are formed on the substrate film 1 for the optical sheet, and is then cured;

(g) A process in which an electron beam curable resin is used in place of the ultraviolet ray curable resin in the above processes (d) to (f), and the like.

In the method of manufacturing the mold having an inverted shape of the microlens array 23, it can be manufactured by, for example: producing a microlens array model through forming a patchy spatial pattern with a photoresist material on a substrate and subjecting this spatial pattern to heat fluidization to thereby make a curved face; laminating a metal layer on the front face of this microlens array model by electroforming; and peeling off this metal layer. Also, as the process for producing the aforementioned microlens array model, a process described in the above item (f) can be employed.

According to the method of the manufacture as described above, the microlens array 23 having an arbitrary shape is formed in an easy and accurate manner. Therefore, the diameter (D), the height ratio (H/R), the spacing ratio (S/D), the filling rate and the like of the microlenses 24 constructing the microlens array 23 can be regulated in an easy and accurate manner. As a result, the optical functions of the optical sheet 20 can be controlled in an easy and accurate manner.

The optical sheet 20 has optical functions such as high light condensation, refraction to the normal line orientation, diffusion and the like by means of the microlens array 23. In addition, the optical functions can be controlled in an easy and accurate manner. Hence, by means of the optical sheet 20, for example, the peak orientation of incident rays of light toward the prism sheet of the backlight unit can be controlled to an angle of gradient that is optimum for refraction toward the normal line orientation side. In addition, the optical sheet 20 can actively convert the polarization orientation of the rays of light outgoing from the optical waveguide plate or the like into the transmission axial orientation of the polarizing plate or the like by means of the substrate film 1 for the optical sheet. Therefore, the optical sheet 20 can markedly enhance utilization efficiency of the rays of light when it is used in, for example, a liquid crystal display device, and thus, high-luminance and energy-saving modeling, as well as space-saving modeling can be facilitated.

The term "microlens" referred to above means a minute lens having a partial spherical surface at the interface, and pertinent examples thereof include e.g., hemispherical convex lenses, hemispherical concave lenses and the like. The term "diameter (D)" herein means a diameter of the microlens at its base or opening. The term "height (H)" herein means a distance in a vertical direction from the basal plane to the top of the microlens in case of the microlens being a convex lens, and a distance in a vertical direction from the opening to the bottom of the microlens in case of the microlens being a concave lens. The term "distances between the lenses" herein means the shortest distance between a pair of adjacent microlenses. The term "filling rate" herein means a ratio of the area of the microlenses per unit area in the projection shape of the front face. The term "regular triangular lattice pattern" herein means a pattern generated by dividing the front face into regular triangular compartments having the same shape, and arranging the microlenses at each vertex of the regular triangle.

The backlight unit for a liquid crystal display device of the present invention has a rectangular optical waveguide plate, a lamp disposed along the edge of the longer side of the optical waveguide plate, a light diffusion sheet overlaid on the optical waveguide plate front face, and rectangular optical sheet such as a prism sheet or the like. As this light diffusion sheet, prism sheet or the like, the aforementioned optical sheet 10 or 20 is used. Transmission axis of the polarizing plate or reflection polarizing plate of a liquid crystal panel laminated to the front face side of the backlight unit is generally orientated at an angle of ±π/4 with respect to the lamp orientation. In addition, the optical sheet 10 or 20 has a function to actively convert the polarization orientation of the rays of light outgoing from the optical waveguide plate or the like into the transmission axial orientation of the polarizing plate or the like, therefore, utilization efficiency of the rays of light emitted from the lamp can be markedly enhanced, and thus, high-luminance, energy-saving, and thin modeling which has been socially demanded these days can be facilitated.

The substrate film for the optical sheet and the optical sheet using the same of the present invention are not limited to the foregoing embodiments. For example, on the substrate film for the optical sheet may be laminated other layer such as an ultraviolet ray absorbing agent layer, a top coat layer or the like. Further, the optical layer of the optical sheet is not limited to the light diffusion layer shown in FIG. 7 and the microlens array shown in FIG. 8, but may be constructed from, for example, multiple prism parts arranged in stripes, a cylindrical lens part or the like.

The microlens constructing the aforementioned microlens array may be formed into a partial shape of an ellipsoid whose long axis is directed to the normal line orientation. According to the microlens having a partial shape of an ellipsoid whose long axis is directed to the normal line orientation, spherical aberration, in turn, loss of the rays of light can be reduced, and optical functions such as a light condensing function to the front side, a diffusing function, a bending function to the normal line orientation and the like of the transmitted rays of light can be enhanced. Flat ratio ($R_L/R_S$) of the radius along the long axis ($R_L$) to the radius along the short axis ($R_S$) of this ellipsoid is preferably 1.05 or greater and 1.7 or less in an attempt to effectively reduce the spherical aberration of the microlens.

The microlens constructing the microlens array as described above may be also formed into a partial shape of an ellipsoid whose long axis is positioned approximately parallel to a certain horizontal orientation. According to the microlens having a partial shape of an ellipsoid whose long axis is positioned approximately parallel to a certain horizontal orientation, anisotropy is involved in the optical function, and specifically, the optical function in the vertical orientation to the long axis is enhanced than the optical function in the parallel orientation to the long axis of the microlens.

In connection with the aforementioned ultraviolet ray absorbing agent, in place of or together with the means to allow the agent to be included in the binder 14 of the optical layer 11 described above, an ultraviolet ray absorption layer containing the ultraviolet ray absorbing agent can be also laminated, alternatively, the ultraviolet ray absorbing agent may be allowed to be included in the binder 16 of the sticking preventive layer 12 or the substrate film 1 for the optical sheet. Also by such means, the ultraviolet ray emitted from the lamp of the backlight unit can be similarly cut off, and disruption of the liquid crystal layer by the ultraviolet ray can be prevented.

In connection with the aforementioned antistatic agent, in place of or together with the means to allow the agent to be included in the binder 14 of the optical layer 11 described above, an antistatic layer containing the antistatic agent can be also laminated, alternatively, the antistatic agent may be allowed to be included in the binder 16 of the sticking preventive layer 12 or the substrate film 1 for the optical sheet. Also by such means, an antistatic effect may be developed on the optical sheet, therefore, disadvantages caused due to electrification with static electricity such as collecting dusts with friction, difficulties in overlaying with other sheet such as a prism sheet or the like can be prevented.

EXAMPLES

Hereinafter, the present invention will be explained in detail by way of Examples, however, the present invention should not be construed as being limited to the description of these Examples.

Relationship Between Angle α in Crystal Orientation with Respect to Short Side Orientation and Front Luminance Light diffusion sheets were produced by: sampling at different positions from an original film obtained through biaxially stretching polyethylene terephthalate; producing rectangular substrate films for an optical sheet having a variety of angles of the crystal orientation with respect to the short side orientation; and laminating a similar light diffusion layer thereon.

Front luminance was measured when these light diffusion sheets were incorporated in a liquid crystal module having a transmission axis of the polarizing plate of the liquid crystal cell being 45° with respect to the lamp orientation.

Relationship between the crystallographic axial angle α and the front luminance are presented in Table 1 below.

TABLE 1

| Crystal orientation angle α (rad) | Crystal orientation angle α (deg) | Front luminance (cd/m²) |
| --- | --- | --- |
| 0 | 0 | 752 |
| π/16 | 11.25 | 925 |
| 3π/32 | 16.875 | 968 |
| π/8 | 22.5 | 984 |
| 5π/32 | 28.125 | 970 |
| 3π/16 | 33.75 | 926 |
| 2π/8 | 45 | 750 |
| 3π/8 | 67.5 | 521 |

As shown in Table 1, when the angle α of the crystal orientation with respect to the short side orientation was π/16 or greater and 3π/16 or less, high front luminance was developed, and fluctuation of the front luminance depending on the angle α was reduced. Moreover, when the angle α of the crystal orientation was 3π/32 or greater and 5π/32 or less, the fluctuation of the front luminance was suppressed to about 3% or less in addition to exhibiting favorable front luminance. Particularly, when the angle α of the crystal orientation was π/8, the highest front luminance was developed. In addition, also in cases of the angle α of the crystal orientation being a negative value, a front luminance that was similar to the value described above was developed with a liquid crystal module having a transmission axis of the polarizing plate of the liquid crystal cell being −45° with respect to the lamp orientation. Therefore, adequacy of the range of the crystallographic axial angle α specified according to the present invention as described above was demonstrated.

Relationship Between Retardation Value and Front Luminance

Substrate films having a variety of retardation values were produced by uniaxially stretching polyethylene terephthalate or polycarbonate. These substrate films were disposed in a liquid crystal module to give the angles of β being π/4 and ψ being −(β/2), and the front luminance was measured. The results are presented in Table 2 below.

TABLE 2

| Retardation value (nm) | Front luminance (cd/m²) |
| --- | --- |
| 16 | 503 |
| 30 | 516 |
| 120 | 715 |
| 140 | 778 |
| 190 | 902 |
| 240 | 972 |
| 260 | 977 |
| 280 | 975 |
| 330 | 903 |
| 390 | 768 |
| 410 | 720 |
| 480 | 602 |
| 560 | 598 |
| 870 | 827 |
| 1140 | 676 |
| 1780 | 598 |
| 2018 | 888 |
| 2250 | 639 |
| 4380 | 555 |
| 4800 | 643 |

As shown in Table 2, relationship between the experimentally determined retardation value and luminance matches to the simulation results shown in FIG. 6. Parts with higher luminance exhibit higher transmissivity of the polarizing plate, and polarization conversion to the transmission axis component was perfected by the phase contrast substrate film. Specifically, when the retardation value was 140 nm or greater and 390 nm or less, 680 nm or greater and 1040 nm or less, and 1350 nm or greater and 1610 nm or less, high front luminance was developed, and the fluctuation of the luminance was regulated to be about 50% or less. Particularly, when the retardation value was 140 nm or greater and 390 nm or less, favorable ease in production of the substrate film 1 for the optical sheet was achieved, with the in-plane fluctuation of the retardation value being decreased to about 30%, and in turn, the fluctuation of the luminance could be suppressed. Additionally, when the retardation value was 190 nm or greater and 330 nm or less, higher luminance was developed, and the fluctuation of the luminance was regulated to be about 10% or less. Furthermore, when the retardation value was 240 nm or greater and 280 nm or less, lowering rate of the front luminance with respect to the peak luminance could be suppressed to about 3% or less. Therefore, adequacy of the range of the retardation value specified according to the present invention as described above was demonstrated.

Relationship Between Phase Advancing Axial Orientation or Phase Retarding Axial Orientation, and Front Luminance A light diffusion sheet was produced by laminating a light diffusion layer on a substrate film having a certain retardation value, and this light diffusion sheet was disposed in a liquid crystal module to give the angles of β being π/4 and ψ being −(β/2). With these angles as bases, front luminance was measured in case of adapting the phase retarding axial orientation and the phase advancing axial orientation. The results are shown in Table 3 below.

TABLE 3

| | Front luminance (cd/m²) | Relative value of front luminance (%) |
| --- | --- | --- |
| Based on phase retarding axial orientation | 820 | 100 |
| Based on phase advancing axial orientation | 828 | 101 |

As shown in Table 3, decision of the crystallographic axial angle α with respect to the short side orientation on the basis of the phase advancing axial orientation could improve the utilization efficiency of the rays of light, and luminance of the backlight unit than the decision thereof on the basis of the phase retarding axial orientation.

What is claimed is:

1. An edge light type back light for use in a liquid crystal display device in which rays of light are dispersed and lead to a front face side, the edge light type back light comprising:
   a rectangular optical waveguide plate;
   a lamp disposed along an edge of a longer side of the optical waveguide plate and that emits said rays of light;
   a light diffusion sheet formed into a rectangular shape, provided with the lamp along an edge of a longer side thereof, and overlaid on a surface of the optical waveguide plate; and
   a prism sheet overlaid on a surface of the light diffusion sheet; and the light diffusion sheet comprising:
- a substrate film for the light diffusion sheet which is made of a transparent resin and which is formed into a rectangular shape, the substrate film for the light diffusion sheet having an optical anisotropy, and having an absolute value of the angle of the crystal orientation with respect to a short side orientation being greater than or equal to $\pi/16$ and less than or equal to $3\pi/16$; and
- an optical layer overlaid on one face of the substrate film for the light diffusion sheet and formed by a polymer composition coating; and
- wherein the transparent resin is polyethylene terephthalate;
- wherein a retardation value of the substrate film is greater than 680 nm;
- wherein the optical layer comprises multiple particles of a light diffusing agent, and a binder therefor;
- wherein an amount of the light diffusing agent, included per 100 parts of substrate polymer in the polymer composition coating, is 10 parts or greater and 200 parts or less as determined on a basis of solid content; and
- wherein the multiple particles of the light diffusing agent are spherical beads.

2. The edge light type back light according to claim 1, wherein the crystal orientation follows the phase advancing axial orientation.

3. The edge light type back light according to claim 1, wherein provided that a polarizer P is disposed on one face side of the substrate film and an analyzer Q is disposed on another face side of the same, and the linear polarized light that passed through the polarizer P (amplitude=1, intensity of transmitted beam=1) transmits the substrate film and then pass through the analyzer Q, when the phase advancing axial orientation and phase retarding axial orientation of crystallographic axis of the substrate film front face is designated as x orientation and y orientation; the thickness of the substrate film is designated as d, refractive index in the x orientation and the y orientation is designated as nx and ny (nx≠ny); angle between the crystal orientation and the transmission axial orientation of the polarizer P is designated as y; and angle between the transmission axial orientation of the polarizer P and the transmission axial orientation of the analyzer Q is designated as b, displacement of the light passed through the analyzer Q is represented by the following mathematical formula (1); intensity of transmitted beam is represented by the following mathematical formula (2); and average intensity of transmitted beams $I_A$ at three wavelengths of RGB is represented by the following mathematical formula (3):

$$E(d,t) = \sin\phi \cos\Theta(d,t)\sin(\beta+\phi) + \cos\phi \cos\{\Theta(d,t)+\delta(d)\}\cos(\beta+\phi) \quad (1)$$

$$I = (1/To)\int_0^{To} E^2 dt \quad (2)$$

$$I_A = (I_1 + I_2 + I_3)/3 \quad (3)$$

wherein, l is wavelength; c is light velocity; t is time; k is $2p/l$; $Q(d,t)$ is $k(nxd-ct)$; and $d(d)$ is $k(ny-nx)d$, $I_1$, $I_2$ and $I_3$ are intensity of transmitted beam of the light passed through the analyzer Q at a wavelength of the incident light of the polarizer P of $l_1$: 430 nm, $l_2$: 550 nm, $l_3$: 610 nm, respectively, and provided that the polarizer P and the analyzer Q are arranged to give the angles of b being p/4 and y being −(b/2), the sheet has a retardation value such that average intensity of transmitted beam $I_A$ derived from the above mathematical formula (3) becomes equal to or greater than 0.75, wherein the retardation value Re is derived from the formula of: Re=(ny−nx)d.

4. The edge light type back light according to claim 1, wherein a sticking preventive layer including beads dispersed in a binder is provided on another face of the substrate film for the light diffusion sheet.

5. An edge light type back light for use in a liquid crystal display device in which rays of light are dispersed and lead to a front face side, the edge light type back light comprising:
- a rectangular optical waveguide plate;
- a lamp disposed along an edge of a longer side of the optical waveguide plate and that emits said rays of light;
- a light diffusion sheet formed into a rectangular shape, provided with the lamp along an edge of a longer side thereof, and overlaid on a surface of the optical waveguide plate; and
- a prism sheet overlaid on a surface of the diffusion sheet; the light diffusion sheet comprising:
  - a substrate film for the light diffusion sheet which is made of a transparent resin and which is formed into a rectangular shape, the substrate film for the light diffusion sheet having an optical anisotropy, and having an absolute value of the angle of the crystal orientation with respect to a short side orientation being greater than or equal to $\pi/16$ and less than or equal to $3\pi/16$; and
  - an optical layer, overlaid on one face of the substrate film for the light diffusion sheet, comprising a polymer composition coating, a plurality of particles of a light diffusing agent, and a binder for said plurality of particles,
- wherein the particles, respectively, have a shape from among the following group of shapes: needle-like, rod-like, cubic, plate-like, squamous, fibrous, and spindular; and
- wherein the transparent resin is polyethylene terephthalate;
- wherein a retardation value of the substrate film is greater than 680 nm;
- wherein an amount of the light diffusing agent, included per 100 parts of substrate polymer in the polymer composition coating, is 10 parts or greater and 200 parts or less as determined on a basis of solid content.

6. The edge light type back light of claim 5, wherein said particles, respectively, have a shape that is cubic.

7. The edge light type back light of claim 5, wherein said particles, respectively, have a shape that is squamous.

8. The edge light type back light of claim 5, wherein said particles, respectively, have a shape that is fibrous.

9. The edge light type back light of claim 5, wherein said particles, respectively, have a shape that is spindular.

* * * * *